United States Patent
Kim et al.

(10) Patent No.: US 9,563,275 B2
(45) Date of Patent: Feb. 7, 2017

(54) DISPLAY DEVICE AND CONTROL METHOD THEREOF

(71) Applicant: LG ELECTRONICS INC., Seoul (KR)

(72) Inventors: Jihwan Kim, Seoul (KR); Doyoung Lee, Seoul (KR); Sinae Chun, Seoul (KR); Yongsin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 14/164,924

(22) Filed: Jan. 27, 2014

(65) Prior Publication Data

US 2015/0091818 A1    Apr. 2, 2015

(30) Foreign Application Priority Data

Sep. 30, 2013  (KR) .......................... 10-2013-0116200

(51) Int. Cl.
*G06F 3/01* (2006.01)
*H04N 13/00* (2006.01)
*G06F 3/0488* (2013.01)

(52) U.S. Cl.
CPC .......... *G06F 3/016* (2013.01); *H04N 13/0051* (2013.01); *G06F 3/0488* (2013.01); *H04N 13/0022* (2013.01)

(58) Field of Classification Search
CPC .... G06F 3/016; G06F 3/0488; H04N 13/0051; H04N 13/0022
See application file for complete search history.

(56) References Cited

U.S. PATENT DOCUMENTS

| 2008/0122803 | A1* | 5/2008 | Izadi ..................... G06F 3/0421 345/175 |
| 2008/0303795 | A1* | 12/2008 | Lowles ......................... 345/173 |
| 2010/0267424 | A1* | 10/2010 | Kim ............................. 455/566 |
| 2011/0249022 | A1* | 10/2011 | Poornachandran et al. .. 345/619 |
| 2011/0320969 | A1* | 12/2011 | Hwang ................ G06F 1/1626 715/765 |
| 2012/0050262 | A1* | 3/2012 | Kim et al. ..................... 345/419 |
| 2012/0162213 | A1* | 6/2012 | Shim et al. ................... 345/419 |
| 2012/0229450 | A1* | 9/2012 | Kim et al. ..................... 345/419 |
| 2012/0249741 | A1* | 10/2012 | Maciocci et al. ............... 348/46 |
| 2013/0176301 | A1* | 7/2013 | Yeon ............................. 345/419 |
| 2013/0278494 | A1* | 10/2013 | Huang ...................... G06F 3/01 345/156 |
| 2014/0143733 | A1* | 5/2014 | Jung .................. G06F 3/04815 715/848 |

* cited by examiner

*Primary Examiner* — Kumar Patel
*Assistant Examiner* — Sejoon Ahn
(74) *Attorney, Agent, or Firm* — Birch, Stewart, Kolasch & Birch, LLP

(57) ABSTRACT

Disclosed is a display device including a display unit to display at least 3D object having different depths, a touch sensor unit to sense a touch input on the display unit, a tactile feedback unit to generate a tactile feedback corresponding to the 3D object, and a processor to control these units. The processor enables a tactile feedback function. If the touch input is sensed, the processor determines whether or not a first touch position as a position of the sensed touch input is within a first display area of a first 3D object having a first depth. If the first touch position is within the first display area, the processor regulates the first depth to make a first surface of the 3D object coincide with a surface of the display unit, and generates a first tactile feedback corresponding to the 3D object.

15 Claims, 9 Drawing Sheets

< Front View >

< Top View >

< Front View >  < Top View >

FIG. 3A

< Front View >  < Top View >

FIG. 3B

< Front View >   < Top View >

FIG. 4A

< Front View >   < Top View >

FIG. 4B

< Front View >   < Top View >

FIG. 4C

< Front View >   < Top View >

FIG. 5A

< Front View >     < Top View >

FIG. 5B

< Front View >     < Top View >

FIG. 5C

< Front View >  < Top View >

FIG. 5D

< Front View >  < Top View >

FIG. 6A

< Front View >   < Top View >

FIG. 6B

< Front View >   < Top View >

FIG. 8

DISPLAY DEVICE AND CONTROL METHOD THEREOF

This application claims the benefit of Korean Patent Application No. 10-2013-0116200, filed on, Sep. 30, 2013, which is hereby incorporated by reference as if fully set forth herein.

BACKGROUND OF THE INVENTION

Field of the Invention

The present disclosure relates to a display device, and more particularly to a display device which displays a 3D object and provides a tactile feedback corresponding to the displayed 3D object.

Discussion of the Related Art

Developments of 3-Dimensional (3D) display technology and touch sensitive display technology enable a user to control a 3D object via a touch input to a surface of a display device. The display device may generate a tactile feedback with respect to the 3D object corresponding to the touch input in an area where the touch input is sensed. This may allow the user to perceive the texture of a touch area via tactile sensation.

In the aforementioned display device, however, an area where the 3D object is displayed and an area where the tactile feedback corresponding to the 3D object is generated may not coincide with each other. This may cause the user to unnaturally perceive the tactile feedback.

SUMMARY OF THE INVENTION

Accordingly, the present disclosure is directed to a display device and a control method thereof that substantially obviate one or more problems due to limitations and disadvantages of the related art.

An object of the present disclosure is to provide a display device which provides a realistic tactile feedback and a control method thereof. More particularly, an object of the present disclosure is to provide a display device which may adjust a depth of a 3D object such that a surface of the corresponding 3D object coincides with a surface of a display unit.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device according to one embodiment includes a display unit configured to display at least one 3D object having different depths, a touch sensor unit configured to sense a touch input on the display unit, a tactile feedback unit configured to generate a tactile feedback corresponding to the 3D object, and a processor configured to control the display unit, the touch sensor unit, and the tactile feedback unit, wherein the processor is further configured to enable a tactile feedback function, if the touch input is sensed, determine whether or not a first touch position of the touch input is within a first display area of a first 3D object having a first depth, wherein the first display area is a display area in the XY plane of the first 3D object, if the first touch position is within the first display area, the processor is configured to adjust the first depth to make a first surface of the first 3D object coincides with a surface of the display unit and generate a first tactile feedback corresponding to the first 3D object.

Further, a control method of a display device according to another embodiment includes displaying at least one 3D object having different depths, enabling a tactile feedback function, sensing a touch input on a display unit, determining whether or not a first touch position of the touch input is within a first display area of a first 3D object having a first depth, wherein the first display area is a display area in the XY plane of the first 3D object, and if the first touch position is within the first display area, adjusting the first depth to make a first surface of the first 3D object coincide with a surface of the display unit and generating a first tactile feedback corresponding to the first 3D object.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE INVENTION

Hereinafter, embodiments will be described in detail with reference to the accompanying drawings and descriptions of the accompanying drawings, but the scope of the disclosure is not limited to or restricted by the embodiments.

Although the terms used in the following description are selected, as much as possible, from general terms that are widely used at present while taking into consideration the functions obtained in accordance with the embodiments, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the present disclosure, a display device may refer to a device configured to display a 3-Dimensional (3D) image. In an embodiment, the display device may include a 3D television, a 3D monitor, or a smart device (e.g., a smartphone, a smart-pad, and a smart-table) that may display a 3D image. Here, the 3D image refers to an image to provide a user with stereoscopic sense/perspective.

The aforementioned display device may display a 3D image using binocular parallax. More specifically, based on the fact that a human attains perspective via binocular parallax due to a distance between two eyes (about 6.5 cm), the display device provides each eye with a different image, i.e. a left-eye image to be seen by the left eye and a right-eye image to be seen by the right eye, thereby allowing the images to be stereoscopically seen via binocular parallax.

In the display device as described above, 3D image display methods are classified into glasses methods and non-glasses methods. The glasses methods may include anaglyphic 3D, polarization 3D, and alternate-frame sequencing methods. The non-glasses method may include parallax barrier, Lenticular lens, and holographic methods.

Figure 1:
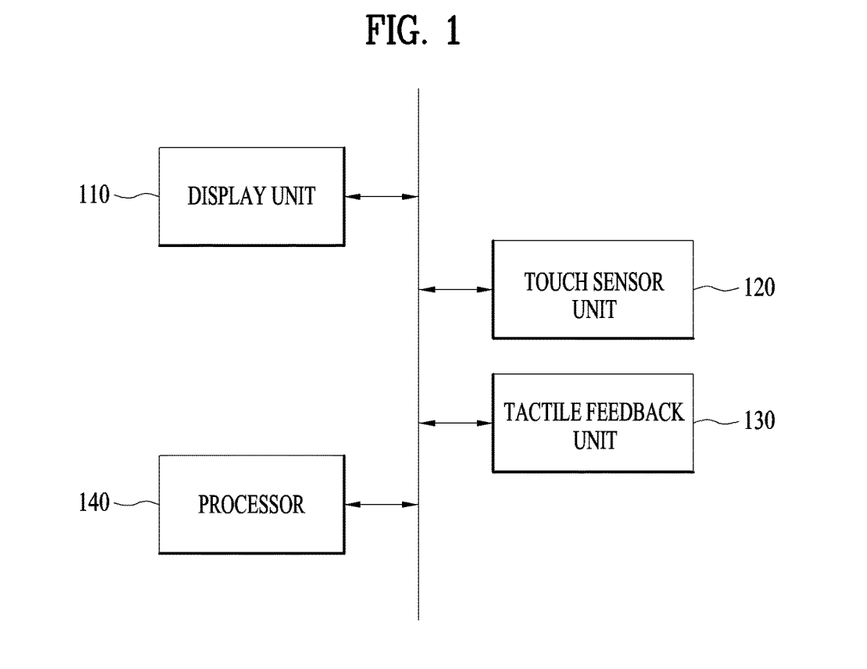
FIG. 1 is a block diagram showing a display device according to an embodiment.

FIG. 1 is a block diagram showing a display device according to an embodiment.

Referring to FIG. 1, the display device 100 may include a display unit 110, a touch sensor unit 120, a tactile feedback unit 130, and a processor 140.

Figure 2A:
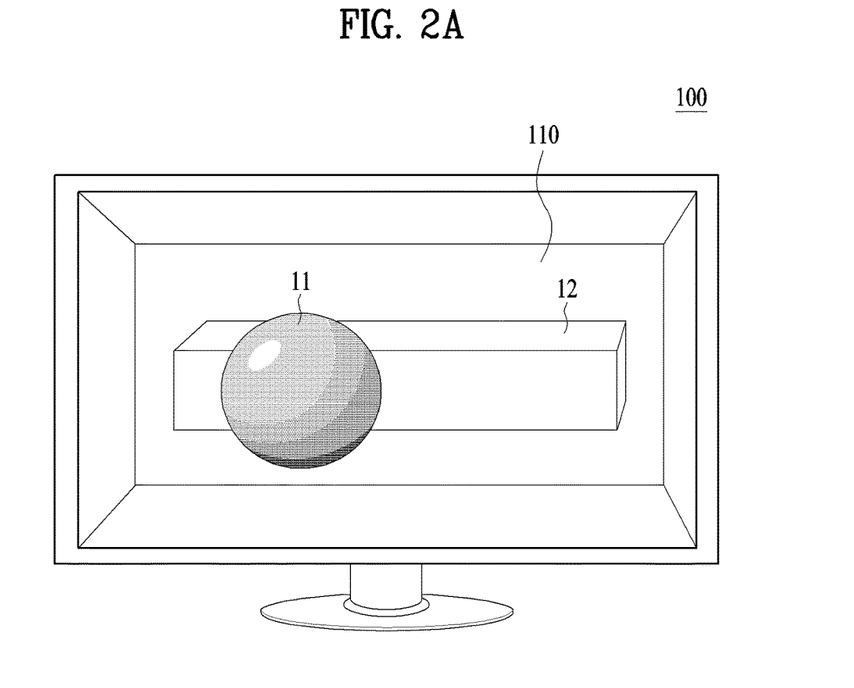
FIGS. 2A and 2B are views showing a display device which displays a 3D object according to an embodiment.
Figure 2B:
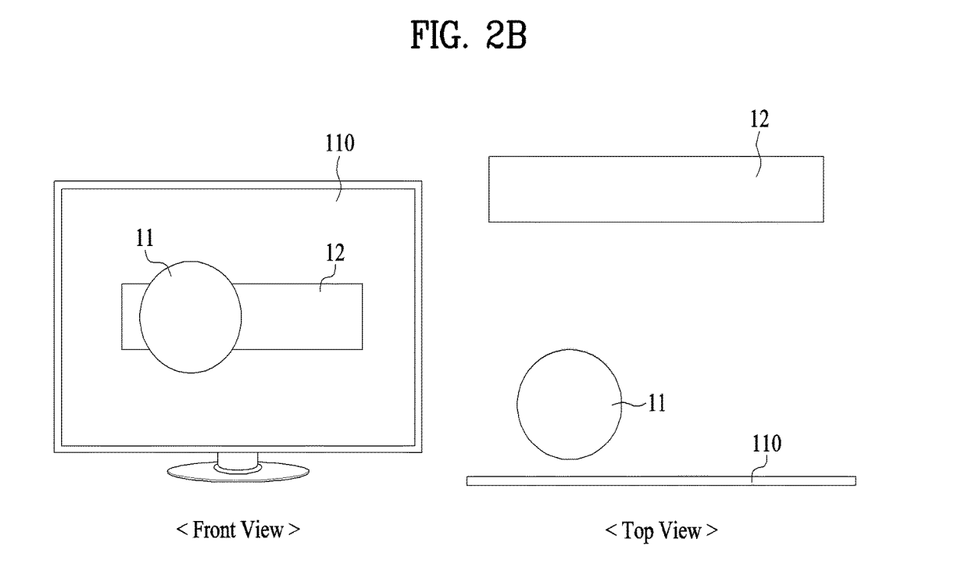

The display unit 110 may display a 3D image. The display unit 110 may display a 3D image by displaying both a left-eye image for the left eye and a right-eye image for the right eye. In this case, the left-eye image and the right-eye image have binocular parallax. This will hereinafter be described in detail with reference to FIG. 2.

In one embodiment, the display unit 110 may include at least one of a Light Emitting Diode (LED) device, an Organic Light Emitting Diode (OLED) device, a Liquid Crystal Display (LCD) device, an electronic ink display, and a flexible display, and may display a 3D image. In another embodiment, the display unit 110 may include a touch sensitive display, and may sense a touch input on the display unit 110. In a further embodiment, the display unit 110 may include a tactile display, and may provide a tactile feedback to the user.

The touch sensor unit 120 may sense a touch input on the display unit 110. In one embodiment, the sensor unit 120 may sense a touch input on the display unit 110 using a pressure sensitive or capacitive touch sensor. In addition, the touch sensor unit 120 may transmit touch information regarding the sensed touch input to the processor 140. The display unit 110 and the touch sensor unit 120 as described above may be integrated into a touch sensitive display unit according to an embodiment.

The tactile feedback unit 130 may generate a tactile feedback corresponding to a 3D object. In one embodiment, the tactile feedback unit 130 may transmit a tactile feedback with respect to the user's finger using a micro vibration actuator or an ultrasonic vibration actuator. In this case, the tactile feedback unit 130 may control a vibration frequency and a vibration magnitude, and consequently may adjust the intensity of a tactile feedback transmitted to the user's finger.

In another embodiment, the tactile feedback unit 130 may provide a tactile feedback to the user by generating micro-amperage current. In this case, the tactile feedback unit 130 may control the intensity and generation period of current, which may allow the user to perceive different tactile sensations.

In a further embodiment, the tactile feedback unit 130 may generate a tactile feedback using ultrasonic resonance. In this case, the tactile feedback unit 130 may generate ultrasonic waves plural times, and cause resonance of the ultrasonic waves at the user's finger to provide a tactile feedback to the user. The tactile feedback unit 130 may adjust the magnitude of a resonance frequency and the generation period of resonance to generate different tactile feedbacks. The display unit 110 and the tactile feedback unit 120 as described above may be integrated into a tactile display unit according to an embodiment.

The processor 140 may execute various applications and process internal data of the device. In addition, the processor 140 may control the aforementioned respective units of the device as well as transmission/reception of data between the units. The processor 140 will hereinafter be described in detail with reference to the accompanying drawings.

In FIG. 1 as a block diagram of the display device according to an embodiment, separately shown blocks logically distinguish elements of the device. Accordingly, the elements of the above-described device may be mounted as a single chip or a plurality of chips based on device design.

FIGS. 2A and 2B are views showing a display device which displays a 3D object according to an embodiment.

FIG. 2A is a stereoscopic view showing a display device which displays a 3D object.

Referring to FIG. 2A, the display device may display a 3D object via the display unit. In this case, the display device may display at least one 3D object having different depths. For instance, as exemplarily shown in FIG. 2A, the display device may display a first 3D object 11 having a first depth and a second 3D object 12 having a second depth.

In one embodiment, the display device may synchronize and display a left-eye image and a right-eye image having binocular parallax via the display unit, thereby displaying a 3D object providing stereoscopic sense/perspective. In one example, the display device may synchronize and display a left-eye image and a right-eye image having negative binocular parallax via the display unit, thereby displaying a 3D object having a depth that protrudes forward of the display unit on the basis of a surface of the display unit. In another example, the display device may synchronize and display a left-eye image and a right-eye image having positive binocular parallax, thereby displaying a 3D object having a depth that is depressed rearward of the display unit on the basis of a surface of the display unit. In the following description, the depth that protrudes forward of the display unit is referred to as a negative depth, the depth that is depressed rearward of the display unit is referred to as a positive depth, and a depth of a surface of the display unit is referred to as a zero depth.

The display device may adjust a depth of a 3D image by adjusting the magnitude of binocular parallax of a left-eye image and a right-eye image to be displayed. In one example, if the magnitude of binocular parallax of a left-eye image and a right-eye image is set to a great value, the display device may generate a 3D object having a great depth, i.e. a 3D object that seems as being displayed at a distant location in space forward or rearward of the display unit.

The left part of FIG. 2B is a front view showing a display device which displays a 3D object.

Referring to the left part of FIG. 2B, it will be appreciated that the first 3D object 11 and the second 3D object 12 have different depths and the second depth of the second 3D object 12 is greater than the first depth of the first 3D object 11. This is achieved as the magnitude of binocular parallax of a left-eye image and a right-eye image for generation of the second 3D object 12 is set to be greater than the magnitude of binocular parallax of a left-eye image and a right-eye image for generation of the first 3D object 11.

The right part of FIG. 2B is a virtual top view showing a display device which displays a 3D object.

More specifically, the right part of FIG. 2B shows a display device viewed from the top under the assumption that a virtual 3D object providing stereoscopic sense/perspective is displayed at a position where the 3D object is seen in reality.

Referring to the right part of FIG. 2B, it will be appreciated that both the first 3D object 11 and the second 3D object 12 have positive depths. This is achieved as both binocular parallax of a left-eye image and a right-eye image for generation of the second 3D object 12 and binocular parallax of a left-eye image and a right-eye image for generation of the first 3D object 11 are set to positive binocular parallax.

Generation of a 3D object and adjustment of a depth of a 3D object as described above with reference to FIGS. 2A and 2B may be equally applied to the following description.

Figure 3A:
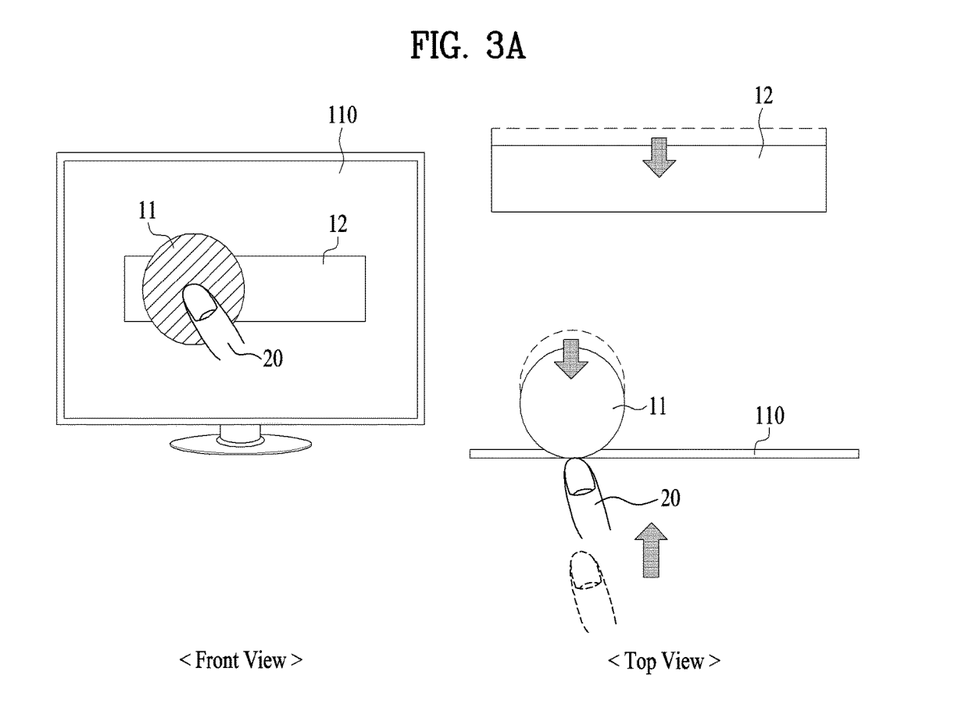
FIGS. 3A and 3B are views showing a display device which senses a touch input on a display unit.
Figure 3B:
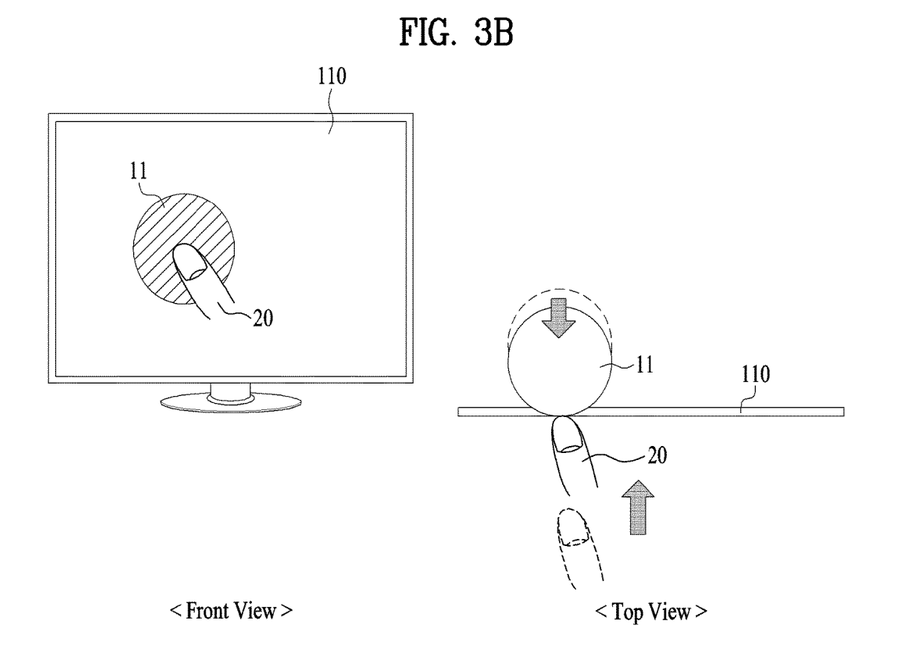

FIGS. 3A and 3B are views showing a display device which senses a touch input on the display unit.

Hereinafter, sensing of a touch input on the display unit will be described in detail based on operation of the processor.

FIG. 3A shows a display device which senses a touch input on the display unit when a plurality of 3D objects is displayed, and FIG. 3B shows a display device which senses a touch input on the display unit when a single 3D object is displayed.

Referring to FIGS. 3A and 3B, the processor may display at least one 3D object having different depths. In one example, the processor, as exemplarily shown in FIG. 3A, may display the first 3D object 11 having a first depth and the second 3D object 12 having a second depth different from the first depth. In another example, the processor, as exemplarily shown in FIG. 3B, may display only the first 3D object 11 having the first depth.

In one embodiment, the processor may receive digital signals containing image data and depth information, generate an image via decoding of the received digital signals, dividing the generated image into a left-eye image and a right-eye image having particular binocular parallax, and synchronizing and displaying the left-eye image and the right-eye image, thereby displaying a 3D object having a particular depth. Here, the digital signals may further contain tactile information.

In addition, the processor may enable a tactile feedback function. The processor may transmit a control signal to the tactile feedback unit to enable the tactile feedback function. In one example, the processor may enable the tactile feedback function upon receiving digital signals containing tactile information. In another example, the processor may enable the tactile feedback function upon displaying a 3D object generated from digital signals containing tactile information. In this way, the processor may selectively enable the tactile feedback function as necessary, which may reduce standby power of the display device.

In addition, the processor may sense a touch input 20 on the display unit, and determine whether or not a first touch position is within a first display area of the first 3D object 11.

Here, the first touch position refers to a position from which sensing of the touch input 20 on the display unit begins. In one example, the first touch position may be touch coordinate from which sensing of the touch input 20 on the display unit begins. In another example, the first touch position may be a touch area from which sensing of the touch input 20 on the display unit begins. Here, the first display area refers to a display area in the XY plane of the first 3D object 11. In this case, the XY plane refers to a plane substantially equal to the orientation of a display unit plane. For instance, the XY plane may be a plane substantially parallel to the display unit plane. In one embodiment, the first display area may be a particular area of the display unit corresponding to the first 3D object 11, and may differ from a display area of the display unit in which a left-eye image and a right-eye image having binocular parallax for generation of the first 3D object 11 are displayed in reality. For instance, the first display area may be a particular area of the display unit defined by (x, y) coordinates equal to (x, y) coordinates of a front-side area of the first 3D object 11. In this case, the first display area may be an area of a display surface, a touch surface, or a tactile surface.

In one embodiment, the processor may recognize touch coordinate, from which sensing of the touch input 20 begins, as the first touch position, and determine whether or not the first display area includes the same (x, y) coordinate as the touch coordinate which is recognized as the first touch position, thereby determining whether or not the first touch position is within the first display area of the first 3D object 11. For instance, if first display area includes the same (x, y) coordinate as the touch coordinate which is recognized as the first touch position, processor may determine the first touch position is within the first display area of the first 3D object. In another embodiment, the processor may recognize a touch area, from which sensing of the touch input 20 begins, as the first touch position, and determine whether or not the first display area substantially includes the touch area which is recognized as the first touch position, thereby determining whether or not the first touch position is within the first display area of the first 3D object 11. For instance, if first display area substantially includes the touch area which is recognized as the first touch position, processor may determine the first touch position is within the first display area of the first 3D object. In addition, the processor may adopt various other methods to determine whether or not the first touch position is within the first display area of the first 3D object 11.

If the first touch position is within the first display area, the processor may adjust the first depth of the first 3D object 11 to make a first surface of the first 3D object 11 coincide with a surface of the display unit. In addition, the processor may adjust the first depth of the first 3D object 11 to make a first surface of the first 3D object 11 coincide with any one of a touch surface, a display surface, or a tactile surface of the display unit. In this case, coincidence may refer to not only accurate coincidence, but also substantial coincidence. Here, the first surface may be at least one surface in the XY plane of the first 3D object 11. In addition, the first surface may be at least one surface of the first 3D object 11 facing a forward direction of the display unit.

In one embodiment, if the first surface has variable depths, the processor may adjust a depth of a first position in the first surface corresponding to the first touch position to coincide with a depth of a surface of the display unit, thereby adjusting the first depth to make the first surface substantially coincide with the surface of the display unit. Here, that the depth of the first surface varies means that the first surface is not a plane having a single depth. For instance, the processor may adjust a depth of a first position in the first surface having the same (x, y) coordinate as the touch coordinate recognized as the first touch position to a zero depth that is a depth of the surface of the display unit, thereby adjusting the first depth to make the first surface substantially coincide with the surface of the display unit. In another embodiment, the processor may adjust a depth of a first position in the first surface corresponding to the touch area recognized as the first touch position to a zero depth that is a depth of the surface of the display unit, thereby adjusting the first depth to make the first surface substantially coincide with the surface of the display unit. In addition, the processor may adopt various other methods to adjust the first depth to make the first surface substantially coincide with the surface of the display unit.

In addition, if the first surface has variable depths, the processor may adjust the smallest depth of the first surface so as to coincide with a depth of the display unit, thereby adjusting the first depth to make the first surface substantially coincides with the surface of the display unit.

If the first surface has a constant depth, the processor may adjust a depth of the first surface so as to coincide with a depth of the surface of the display unit, thereby adjusting the first depth to make the first surface substantially coincides with the surface of the display unit.

As described above, if the first depth of the first 3D object is adjusted, the processor may adjust depths of the at least one 3D objects together with the first depth. For instance, as exemplarily shown in FIG. 3A, the processor may adjust a second depth of the second 3D object 12 by the same width as an adjustment width of the first depth of the first 3D object 11. Thereby, it is possible to maintain a constant distance between the first 3D object 11 and the second 3D object 12 displayed before and after depth adjustment, which may provide the user with constant perspective between the first 3D object 11 and the second 3D object 12.

If the first touch position is within the first display area, the processor may generate a first tactile feedback corresponding to the first 3D object 11. The processor may generate the first tactile feedback via the tactile feedback unit using tactile information contained in digital signals for generation of the first 3D object 11. The processor may generate the first tactile feedback at the first touch position, or in the first display area corresponding to the first touch position.

In this case, the processor may generate the first tactile feedback corresponding to the first 3D object 11 using the tactile feedback unit. In one embodiment, the tactile feedback unit may generate the first tactile feedback corresponding to the first 3D object 11 using ultrasonic vibration, and control the first tactile feedback by changing at least one of the frequency and magnitude of ultrasonic vibration. In another embodiment, the tactile feedback unit may generate the first tactile feedback corresponding to the first 3D object 11 via generation of micro-amperage current, and control the first tactile feedback by changing at least one of the intensity and generation period of micro-amperage current.

Hereinafter, various embodiments with regard to the case in which the processor detects movement of a sensed touch input will be described with reference to FIGS. 4A to 5D.

Figure 4A:
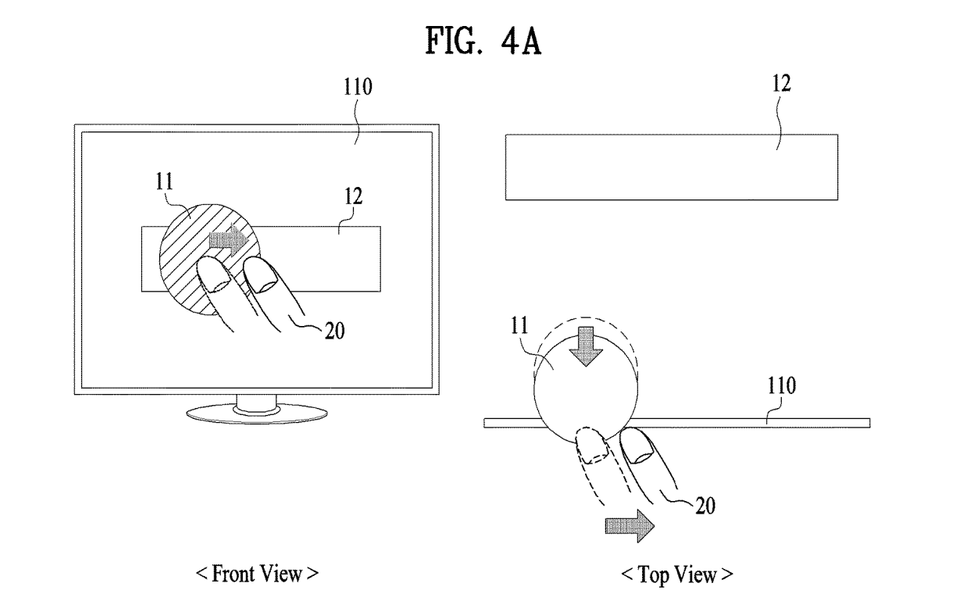
FIGS. 4A to 4C are views showing a display device which detects movement of a sensed touch input according to one embodiment.
Figure 4B:
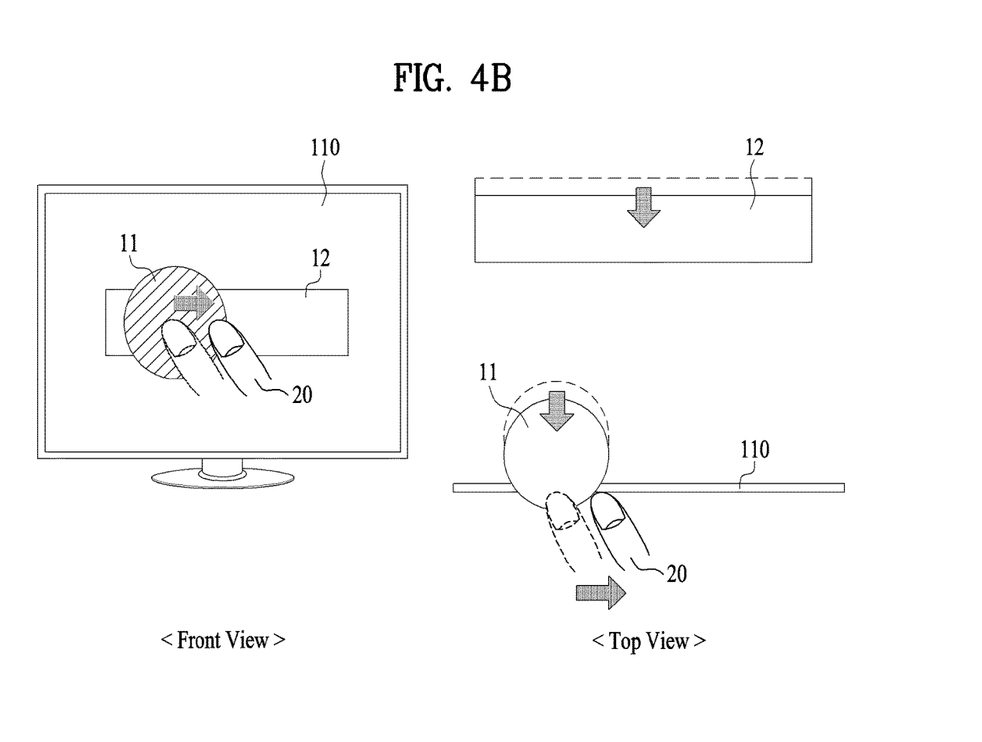
Figure 4C:
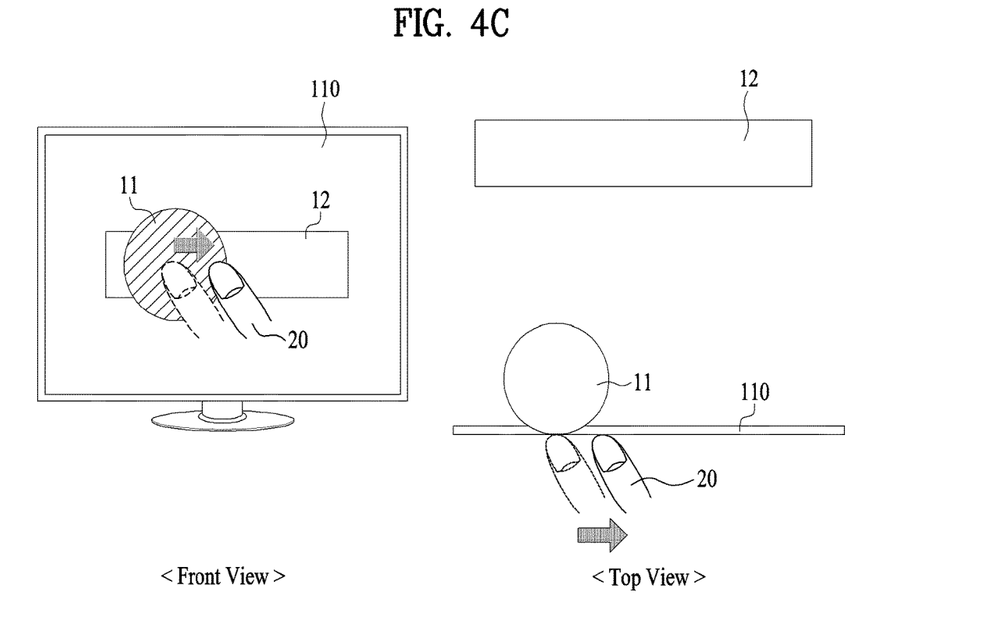

FIGS. 4A to 4C are views showing a display device which detects movement of a sensed touch input according to one embodiment, and FIGS. 5A to 5D are views showing a display device which detects movement of a sensed touch input according to another embodiment.

As described above with reference to FIGS. 3A and 3B, when a touch input on the display unit is sensed, the processor may determine whether or not the first touch position is within the first display area of the first 3D object 11. In addition, if the first touch position is within the first display area of the first 3D object 11, the processor may adjust the first depth to make the first surface of the first 3D object 11 coincide with the surface of the display unit, and may generate the first tactile feedback corresponding to the first 3D object 11.

In addition, the processor may detect movement of the sensed touch input. In one embodiment, the processor may detect movement of the sensed touch input based on touch information provided by the touch sensor unit. More specifically, the processor may detect whether or not the sensed touch input moves from the first touch position to a second touch position while maintaining contact with the display unit based on information provided by the touch sensor unit.

If the touch input moves while maintaining contact with the display unit, the processor may determine whether a second touch position is within the first display area of the first 3D object 11 or within a second display area of the second 3D object 12.

Here, the second touch position refers to a position to which the sensed touch input moves while maintaining contact with the display unit. In one example, the second touch position may be touch coordinates to which the sensed touch input moves. In another example, the second touch position may be a touch area to which the sensed touch input moves. Here, the first display area is equal to the above description of FIGS. 3A and 3B, and thus a detailed description of this will be omitted. Here, the second display area refers to a display area in the XY plane of the second 3D object 12. In this case, the XY plane refers to a plane substantially equal to the orientation of a display unit plane. For instance, the XY plane may be a plane substantially parallel to the display unit plane. In one embodiment, the second display area may be a particular area of the display unit corresponding to the second 3D object 12, and may differ from a display area of the display unit in which a left-eye image and a right-eye image having binocular parallax for generation of the second 3D object 12 are displayed in reality. For instance, the second display area may be a particular area of the display unit defined by (x, y) coordinates equal to (x, y) coordinates of a front-side area of the second 3D object 12. In this case, the second display area may be an area of a display surface, a touch surface, or a tactile surface.

In this case, the processor may determine whether the second touch position is within the first display area of the first 3D object 11, or within the second display area of the second 3D object 12 via the same method as the method of determining whether or not the first touch position is within the first display area of the first 3D object 11 as described above with reference to FIGS. 3A and 3B.

FIGS. 4A to 4C show embodiments with regard to the case in which the second touch position is within the first display area of the first 3D object 11. That is, FIGS. 4A to 4C show embodiments with regard to the case in which the touch position of the touch input moves within the same 3D object. In this case, a depth of the first surface of the first 3D object 11 varies between FIGS. 4A to 4C.

Referring to FIGS. 4A to 4C, if the second touch position is within the first display area of the first 3D object 11, the processor may maintain the generated first tactile feedback. That is, as exemplarily shown in FIGS. 4A to 4C, the processor may maintain the generated tactile feedback without the need to generate changed tactile feedback because the touch position of the touch input moves within the same 3D object.

Then, the processor may adjust the first depth of the first 3D object 11 and/or a second depth of the second 3D object 12 based on the second touch position.

As exemplarily shown in FIG. 4A, if the second touch position is within the first display area of the first 3D object 11 and the first surface of the first 3D object 11 has variable depths, the processor may adjust the first depth of the first 3D object 11. In this case, the processor may adjust the first depth of the first 3D object 11 to make a depth of a point of the first surface corresponding to the second touch position coincide with a depth of the surface of the display unit. In this case, the processor may adjust the first depth of the first 3D object 11 via the above-described method of FIGS. 3A and 3B.

As exemplarily shown in FIG. 4B, if the second touch position is within the first display area of the first 3D object 11 and the first surface of the first 3D object 11 has variable depths, the processor may adjust the second depth of the second 3D object 12 as well as the first depth of the first 3D object 11. In this case, the processor may adjust the second depth of the second 3D object 12 by the same width as an adjustment width of the first depth and in the same direction as an adjustment direction of the first depth of the first 3D object 11. In this case, the processor may adjust the second depth of the second 3D object 12 via the above-described method of FIGS. 3A and 3B. Thereby, it is possible to maintain a constant distance between the first 3D object 11 and the second 3D object 12 displayed before and after depth adjustment, which may provide the user with constant perspective between the first 3D object 11 and the second 3D object 12.

As exemplarily shown in FIG. 4C, if the second touch position is within the first display area of the first 3D object 11 and a depth of the first surface of the first 3D object 11 has variable depths, the processor may maintain the first depth of the first 3D object 11 and the second depth of the second 3D object. That is, if movement of the touch input is detected within the 3D object generating the same tactile feedback, the processor may not adjust the depth of the 3D object. In addition, even when the second touch position is within the first display area of the first 3D object 11 and the first surface of the first 3D object 11 has a constant depth, the processor may maintain the first depth of the first 3D object 11 and the second depth of the second 3D object.

Figure 5A:
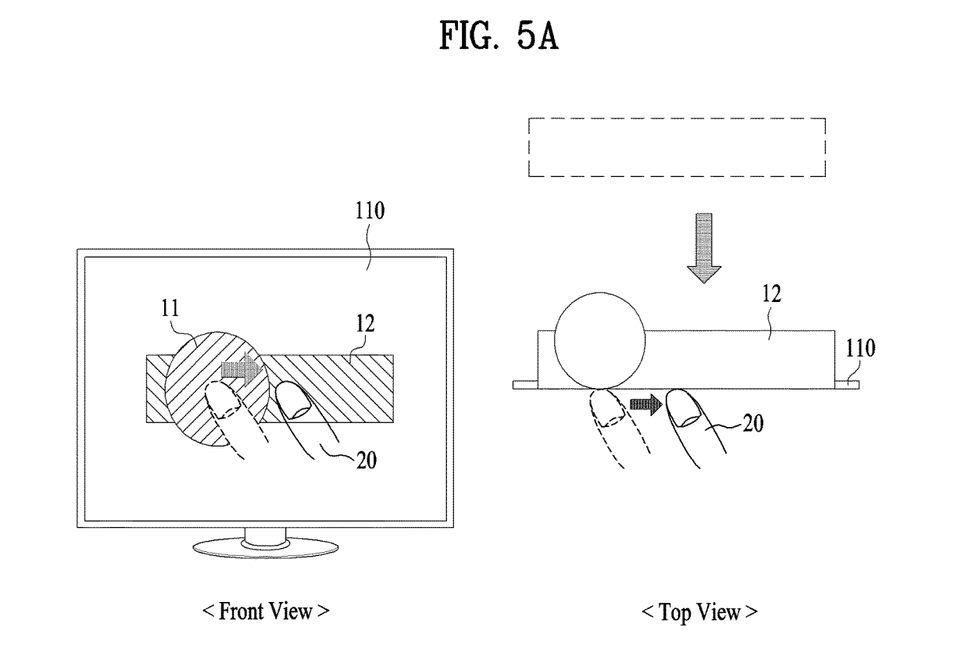
FIGS. 5A to 5D are views showing a display device which detects movement of a sensed touch input according to another embodiment.
Figure 5B:
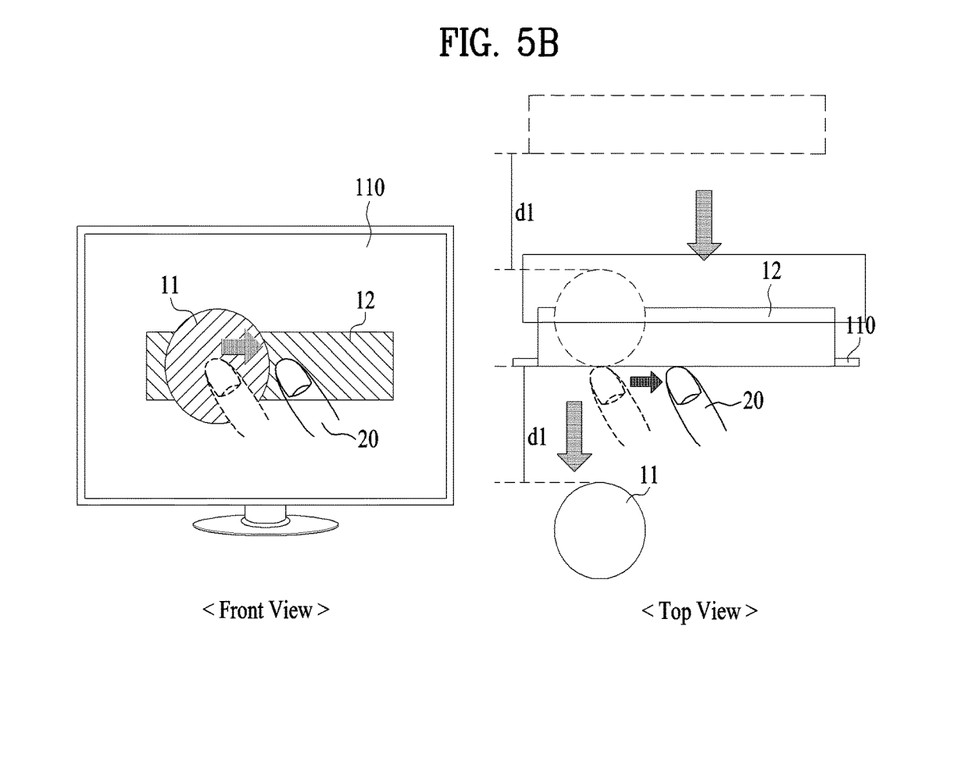
Figure 5C:
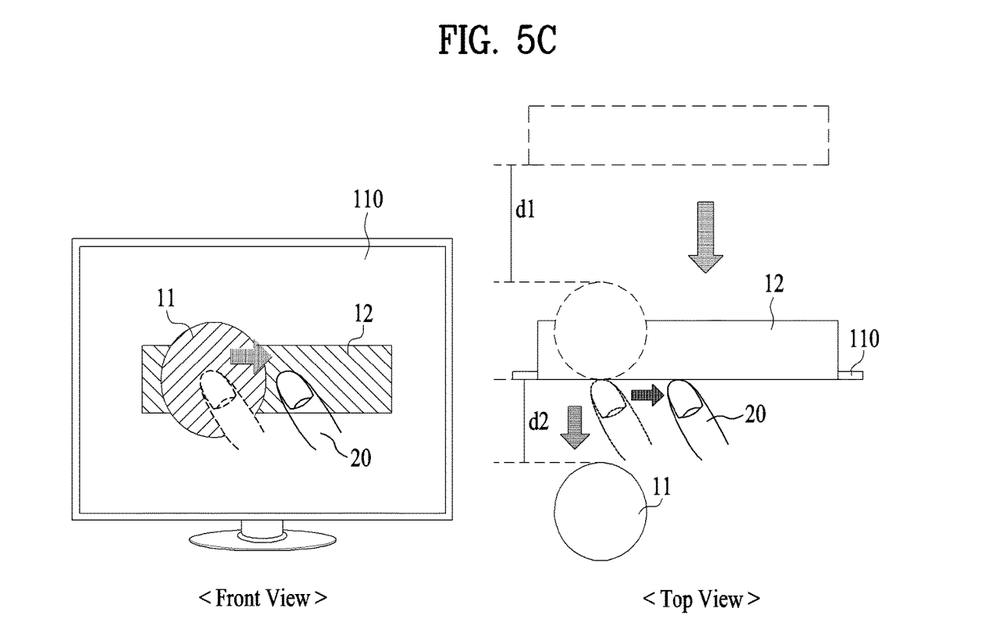
Figure 5D:
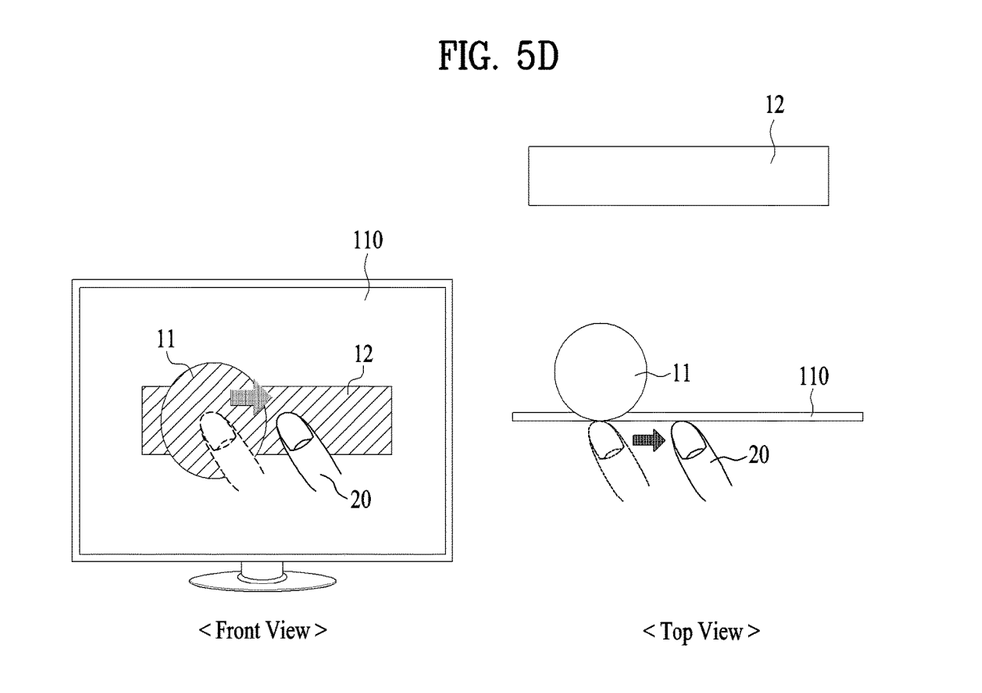

FIGS. 5A to 5D show embodiments with regard to the case in which the second touch position is within the second display area of the second 3D object 12. That is, FIGS. 5A to 5D show embodiments with regard to the case in which the touch position of the touch input moves to another 3D object. In this case, FIGS. 5A to 5C show the case in which a first tactile feedback and a second tactile feedback differ from each other, and FIG. 5D shows the case in which a first tactile feedback and a second tactile feedback are equal to each other. In FIGS. 5A to 5D, whether or not a first tactile feedback and a second tactile feedback are equal to each other may be distinguished based on the direction of oblique lines.

Referring to FIGS. 5A to 5D, if the second touch position is within the second display area of the second 3D object 12, the processor may generate a second tactile feedback corresponding to the second 3D object 12.

In addition, the processor may adjust the first depth of the first 3D object 11 and/or the second depth of the second 3D object 12 based on the second touch position.

As exemplarily shown in FIG. 5A, if the second touch position is within the second display area and the first tactile feedback and the second tactile feedback differ from each other, the processor may adjust the second depth of the second 3D object 12 to make a second surface of the second 3D object 12 coincide with the surface of the display unit. In this case, the processor may adjust the second depth of the second 3D object 12 via the above-described method of FIGS. 3A and 3B.

As exemplarily shown in FIG. 5B, if the second touch position is within the second display area and the first tactile feedback and the second tactile feedback differ from each other, the processor may adjust the first depth of the first 3D object 11 as well as the second depth of the second 3D object 12. In this case, the processor may adjust the first depth of the first 3D object 11 by the same width as an adjustment width of the second depth and in the same direction as an adjustment direction of the second depth of the second 3D object 12. In this case, the processor may adjust the second depth of the second 3D object 12 via the above-described method of FIGS. 3A and 3B. Thereby, it is possible to maintain a constant distance d1 between the first 3D object 11 and the second 3D object 12 displayed before and after depth adjustment, which may provide the user with constant perspective between the first 3D object 11 and the second 3D object 12.

As exemplarily shown in FIG. 5C, if the second touch position is within the second display area and the first tactile feedback and the second tactile feedback differ from each other, the processor may adjust the first depth of the first 3D object 11 as well as the second depth of the second 3D object 12. In this case, the processor may adjust the first depth of the first 3D object 11 in proportion to an adjustment width of the second depth of the second 3D object 12. That is, the processor may adjust the first depth of the first 3D object 11 by a width that is reduced or increased by a predetermined ratio from an adjustment width of the second depth of the second 3D object 12. In this case, the processor may adjust the first depth of the first 3D object 11 via the above-described method of FIGS. 3A and 3B. Thereby, as a distance d1 between the first 3D object 11 and the second 3D object 12 displayed before depth adjustment differs from a distance d2 between the first 3D object 11 and the second 3D object 12 displayed after depth adjustment, it is possible to provide the user with changed sense of distance between the first 3D object 11 and the second 3D object 12 according to depth adjustment.

As exemplarily shown in FIG. 5D, if the second touch position is within the second display area and the first tactile feedback and the second tactile feedback are equal to each other, the processor may maintain the first depth of the first 3D object 11 and the second depth of the second 3D object 12.

Hereinafter, various embodiments with regard to the case in which sensing of a touch input ends will be described.

Figure 6A:
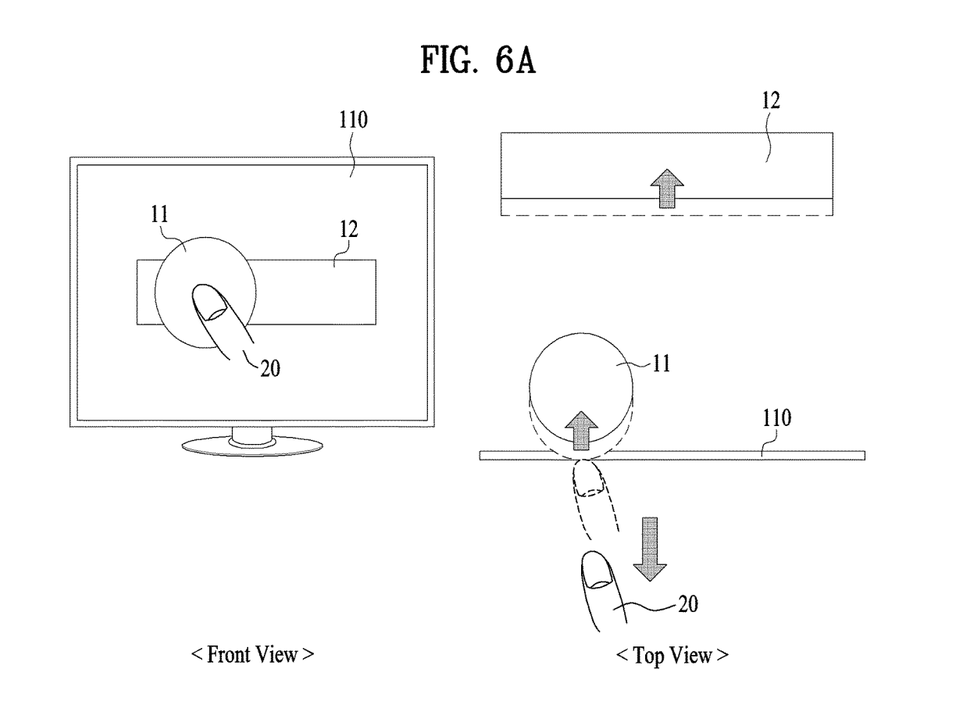
FIGS. 6A and 6B are views showing a display device which ends sensing of a touch input according to an embodiment.
Figure 6B:
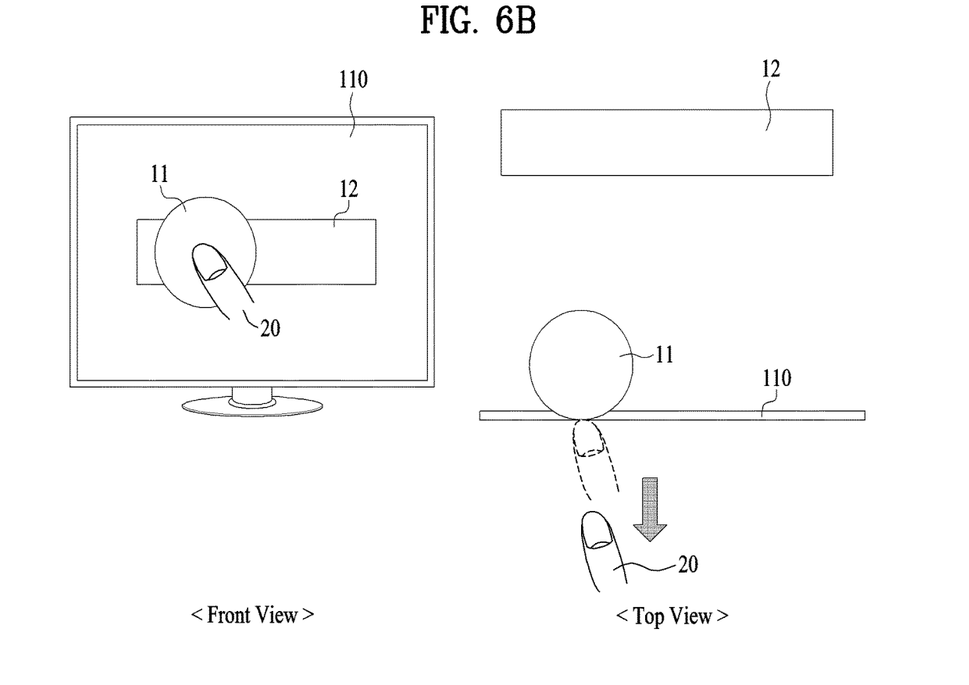

FIGS. 6A and 6B are views showing a display device which ends sensing of a touch input according to an embodiment.

The processor may recognize end of sensing of a touch input on the display unit. More specifically, the processor may recognize end of sensing of a touch input on the display unit based on information provided by the touch sensor unit. In one embodiment, the processor may recognize end of sensing of a touch input by sensing the absence of the touch input for a predetermined time or more.

Referring to FIG. 6A, if end of sensing of a touch input is recognized, the processor may readjust the first depth of the first 3D object 11 and the second depth of the second 3D object 12 to a default depth. That is, if end of sensing of a touch input is recognized, the processor may readjust the first depth of the first 3D object 11 to a first default depth and the second depth of the second 3D object 12 to a second default depth. In this case, the processor may readjust the first depth of the first 3D object 11 and the second depth of the second 3D object 12 respectively via the above-described method of FIGS. 3A to 5D. In addition, if end of sensing of a touch input is recognized, the processor may readjust any one of the first depth of the first 3D object 11 or the second depth of the second 3D object 12 to a default depth. For instance, if end of sensing of a touch input is recognized, the processor may readjust only a depth of a 3D object providing a tactile feedback when sensing of a touch input ends to a default depth. In this case, the processor may readjust the first depth of the first 3D object 11 or the second depth of the second 3D object 12 via the above-described method of FIGS. 3A to 5D. In addition, if the first depth and/or the second depth to a default depth is adjusted, the processor may provide visual effects showing the procedure of readjusting the first depth and/or the second depth to a default depth. For instance, the processor may visually show movement of the first 3D object 11 and the second 3D object 12, thereby providing visual effects showing the procedure of readjusting the first depth and/or the second depth to a default depth.

Referring to FIG. 6B, if end of sensing of a touch input is recognized, the processor may maintain the first depth of the first 3D object 11 or the second depth of the second 3D object 12 at a depth acquired when sensing of the touch input ends.

Figure 7:
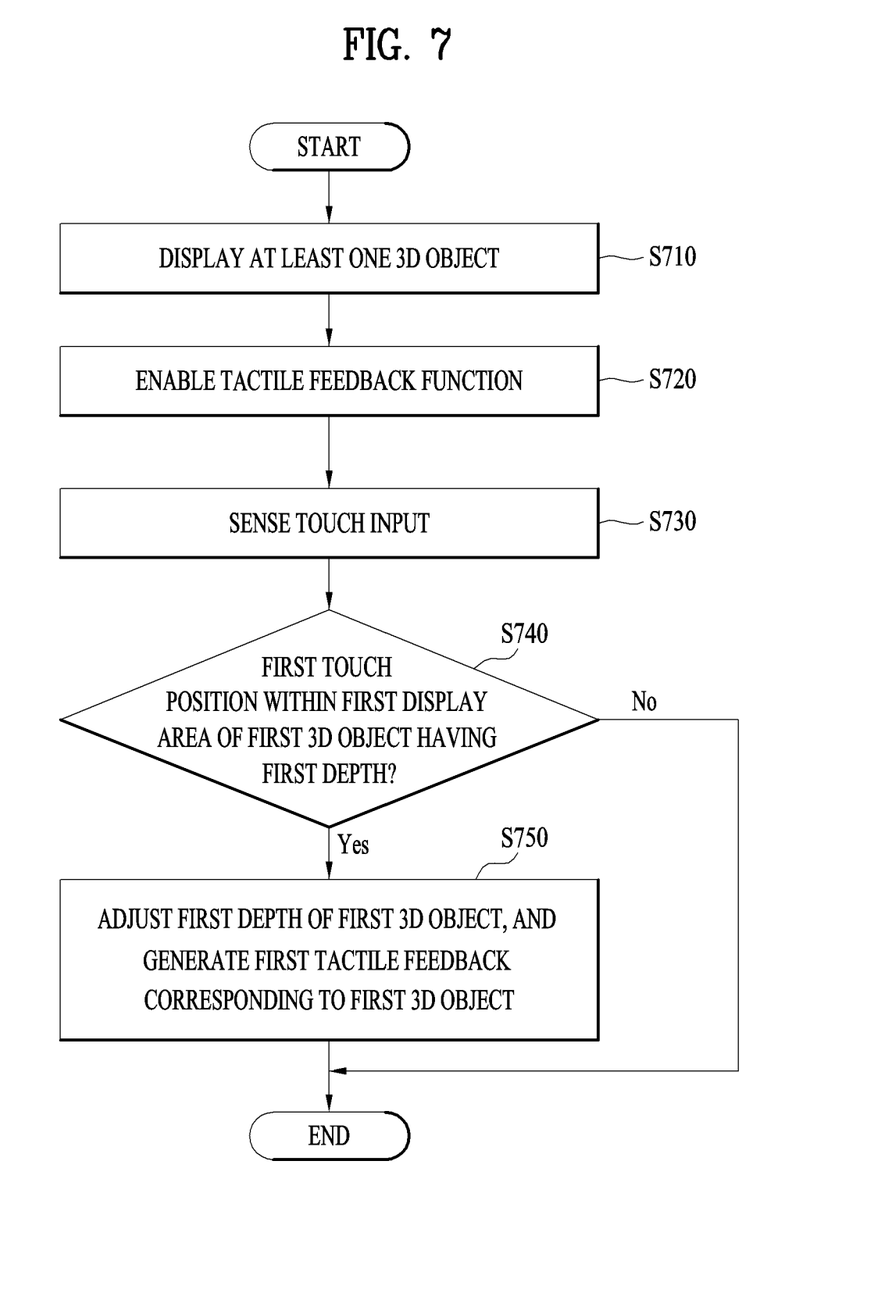
FIG. 7 is a flowchart showing a control method of a display device according to one embodiment.

FIG. 7 is a flowchart showing a control method of a display device according to one embodiment.

Referring to FIG. 7, the display device may display at least one 3D object having different depths (S710). In one example, the display device may display a first 3D object having a first depth, and a second 3D object having a second depth different from the first depth. In another example, the display device may display only the first 3D object having the first depth.

In one embodiment, the display device may receive digital signals containing image data and depth information, generate an image via decoding of the received digital signals, dividing the generated image into a left-eye image and a right-eye image having particular binocular parallax, and synchronizing and displaying the left-eye image and the right-eye image, thereby displaying a 3D object having a particular depth. Here, the digital signals may further contain tactile information.

Next, the display device may enable a tactile feedback function (S720). In one example, the display device may enable the tactile feedback function upon receiving digital signals containing tactile information. In another example, the display device may enable the tactile feedback function upon displaying the 3D object generated from the digital signals containing the tactile information. In this way, the display device may selectively enable the tactile feedback function as necessary, which may reduce standby power of the display device.

Next, the display device may sense a touch input on a display unit (S730). In one embodiment, the display unit may sense the touch input on the display unit using a touch sensor unit.

Next, the display device may determine whether or not a first touch position is within a first display area of a first 3D object (S740). Here, the first touch position refers to a position from which sensing of the touch input on the display unit begins. In one example, the first touch position may be touch coordinates from which sensing of the touch input on the display unit begins. Here, the first display area refers to a display area in the XY plane of the first 3D object. In this case, the XY plane refers to a plane substantially equal to the orientation of a display unit plane. The first touch position and the first display area have been described above with reference to FIGS. 3A and 3B, and thus a detailed description of this will be omitted hereinafter.

In one embodiment, the display device may recognize touch coordinates of a point, from which sensing of the touch input begins, as the first touch position, and determine whether or not the first display area includes the same (x, y) coordinates as the corresponding touch coordinates, thereby judging whether or not the first touch position is within the first display area. The display device determines whether or not the first touch position is within the first display area via the above-described method of FIGS. 3A and 3B, and thus a detailed description of this will be omitted hereinafter.

Next, if the first touch position is within the first display area, the display device may adjust the first depth of the first 3D object to make a first surface of the first 3D object coincide with a surface of the display unit, and may generate a first tactile feedback corresponding to the first 3D object (S750). Here, the first surface may be at least one surface in the XY plane of the first 3D object. In addition, the first surface may be at least one surface of the first 3D object facing a forward direction of the display unit. The first surface has been described above with reference to FIGS. 3A and 3B, and thus a detailed description of the first surface will be omitted hereinafter.

In one embodiment, if the first surface has variable depths, the display device may adjust a depth of a position in the first surface corresponding to the first touch position to coincide with a depth of the surface of the display unit, thereby adjusting the first depth to make the first surface substantially coincide with the surface of the display unit. In another embodiment, if the first surface has a constant depth, the display device may adjust a depth of the first surface so as to coincide with a depth of the surface of the display unit, thereby adjusting the first depth to make the first surface substantially coincide with the surface of the display unit. The display device may adjust the first depth to make the first surface of the first 3D object coincide with the surface of the display unit and displays the first 3D object via the above-described method of FIGS. 3A and 3B, and thus a detailed description of this will be omitted hereinafter.

In addition, the display device may generate the first tactile feedback corresponding to the first 3D object using a tactile feedback unit. In this case, the processor may generate the first tactile feedback at the first touch position or in a first display area corresponding to the first touch position.

In one embodiment, the tactile feedback unit may generate the first tactile feedback corresponding to the first 3D object using ultrasonic vibration, and control the first tactile feedback by changing at least one of the frequency and magnitude of ultrasonic vibration. In another embodiment, the tactile feedback unit may generate the first tactile feedback corresponding to the first 3D object via generation of micro-amperage current, and control the first tactile feedback by changing at least one of the intensity and generation period of micro-amperage current. The display device generates the first tactile feedback corresponding to the first 3D object via the above-described method of FIGS. 3A and 3B, and thus a detailed description of this will be omitted hereinafter.

Figure 8:
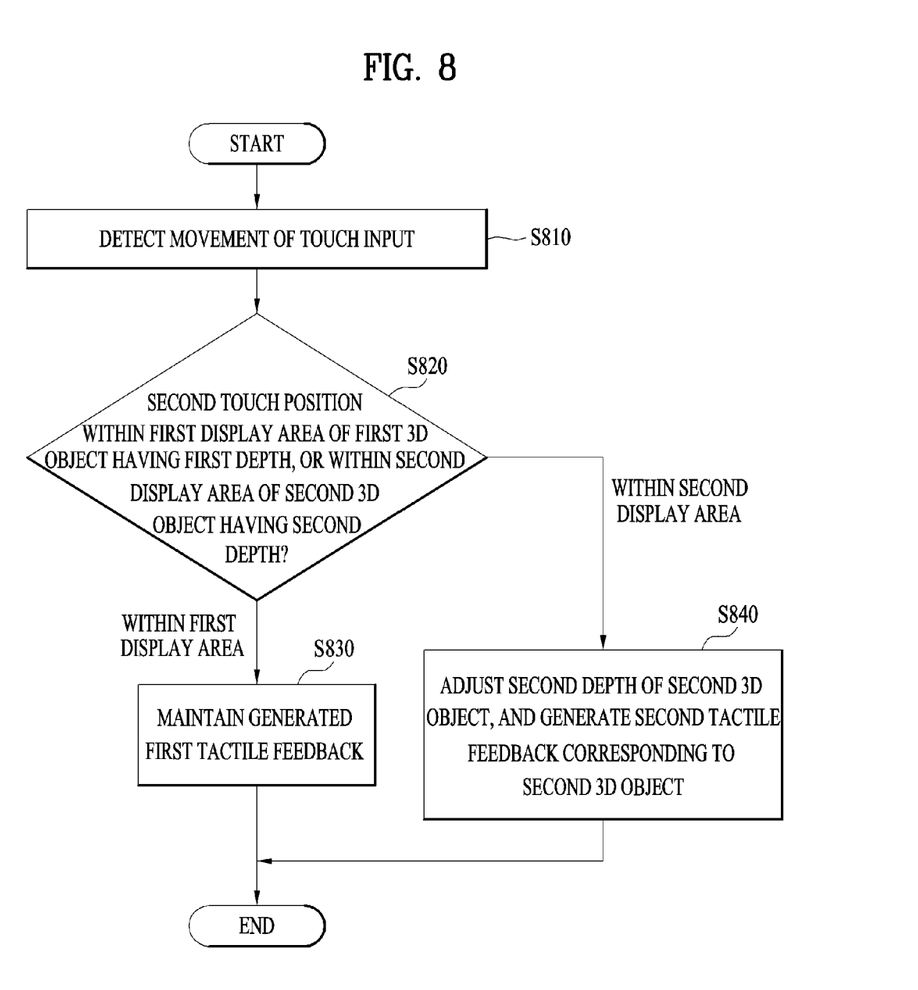
FIG. 8 is a flowchart showing a control method of a display device according to another embodiment.

FIG. 8 is a flowchart showing a control method of a display device according to another embodiment.

Referring to FIG. 8, the display device may detect movement of a touch input (S810). In one embodiment, the display device may detect movement of the sensed touch input based on touch information provided by the touch sensor unit. More specifically, the display device may detect whether or not the sensed touch input moves while maintaining contact with the display unit based on information provided by the touch sensor unit.

Next, if the touch input moves while maintaining contact with the display unit, the display device may determine whether a second touch position is within the first display area of the first 3D object, or within a second display area of a second 3D object (S820). Here, the second touch position refers to a position to which the sensed touch input moves while maintaining contact with the display unit. Here, the second display area refers to a display area in the XY plane of the second 3D object. In this case, the XY plane refers to a plane substantially equal to the orientation of a display unit plane. The second touch position and the second display area have been described above with reference to FIGS. 3A to 5D, and thus a detailed description thereof will be omitted hereinafter. In addition, the display device determines whether or not the second touch position is within the first display area, or within the second display area via the above-described method of FIGS. 3A and 3B, and thus a detailed description of this will be omitted hereinafter.

Next, if the second touch position is within the first display area, the display device may maintain the generated first tactile feedback (S830).

Next, if the second touch position is within the second display area, the display device may adjust a second depth of the second 3D object to make a second surface of the second 3D object coincide with the surface of the display unit, and may generate a second tactile feedback corresponding to the second 3D object (S840). In this case, the display device may adjust the second depth of the second 3D object via the above-described method of FIGS. 3A and 3B, and thus a detailed description of this will be omitted hereinafter. In addition, the display device may generate the second tactile feedback corresponding to the second 3D object the above-described method of FIGS. 3A and 3B, and thus a detailed description of this will be omitted hereinafter.

As is apparent from the above description, according to an embodiment, a display device may adjust a depth of a 3D object for provision of a tactile feedback to make a surface of the 3D object coincides with a surface of a display unit, thereby providing a user with a real vivid tactile feedback.

Further, the display device may adjust a depth of a 3D object for provision of a tactile feedback based on a touch position of a touch input to make a surface of the 3D object coincide with a surface of a display unit, thereby providing a user with a tactile feedback.

Furthermore, the display device may adjust a depth of another 3D object simultaneously with adjustment of the depth of the 3D object for provision of the tactile feedback.

In addition, the display device may enable a tactile function as necessary, thereby achieving reduction of power consumption.

Although the respective drawings have been described individually for convenience, the embodiments described in the respective drawings may be combined to realize novel embodiments. In addition, designing a computer readable recording medium in which a program to execute the above-described embodiments is recorded according to a need of those skilled in the art is within the scope of the disclosure.

In addition, the display device and the control method thereof are not limited to the configurations and methods of the above described embodiments, and all or some of the embodiments may be selectively combined to achieve various modifications.

It will be apparent that, although the preferred embodiments have been shown and described above, the disclosure is not limited to the above-described specific embodiments, and various modifications and variations can be made by those skilled in the art without departing from the gist of the appended claims. Thus, it is intended that the modifications and variations should not be understood independently of the technical sprit or prospect of the disclosure.

In addition, the disclosure describes both a device invention as well as a method invention, and descriptions of both inventions may be complementarily applied as needed.

What is claimed is:

1. A display device comprising: a display configured to display at least one 3D object having different depths; a touch sensor configured to sense a touch input on the display; a tactile feedback actuator configured to generate a tactile feedback corresponding to the 3D object; and a processor configured to control the display, the touch sensor, and the tactile feedback actuator, wherein the processor is further configured to: display a first 3D object having a first depth, wherein the first depth is obtained by synchronizing a left eye image and a right eye image having binocular parallax, enable a tactile feedback function, determine whether or not a first touch position of the touch input is within a first display area of the first 3D object having the first depth in response to the touch input, wherein the first display area is a display area in the XY plane of the first 3D object, adjust the first depth to make a first surface of the first 3D object coincide with a surface of the display and generate a first tactile feedback corresponding to the first 3D object when the first touch position is within the first display area, wherein the adjusted first depth is different from the first depth, adjust the adjusted first depth to the first depth when the touch input is ended, if the touch input is moved from the first touch position to a second touch position while maintaining contact with the display, determine whether the second touch position is within the first display area of the first 3D object, or within a second display area of a second 3D object having a second depth, wherein the second depth is different from the first depth, and the second display area is a display area in the XY plane of the second 3D object, if the second touch position is within the second display area, adjust the second depth to make a second surface of the second 3D object coincide with the surface of the display and generate a second tactile feedback corresponding to the second 3D object, if the second depth of the second 3D object is adjusted, adjust the first depth of the first 3D object together with the second depth, and if the first depth of the first 3D object is adjusted together with the second depth, adjust the first depth in proportion to an adjustment value of the second depth.

2. The display device according to claim 1, wherein the first surface of the first 3D object is at least one surface in the XY plane of the first 3D object.

3. The display device according to claim 1, wherein the first surface of the first 3D object is at least one surface in a forward direction of the display.

4. The display device according to claim 1, wherein, if the first surface of the first 3D object has a constant depth, the processor is further configured to adjust the first depth of the first 3D object to make the depth of the first surface coincide with a depth of the surface of the display.

5. The display device according to claim 1, wherein, if the first surface of the first 3D object has variable depths, the processor is further configured to adjust the first depth of the first 3D object to make a depth of a first position in the first surface of the first 3D object corresponding to the first touch position coincide with a depth of the surface of the display.

6. The display device according to claim 1, wherein, if the first depth of the first 3D object is adjusted, the processor is further configured to adjust depth of the at least one 3D object together with the first depth.

7. The display device according to claim 1, wherein if the second touch position is within the first display area, the processor is further configured to maintain the generated first tactile feedback.

8. The display device according to claim 1, wherein the second surface of the second 3D object is a surface in the XY plane of the second 3D object.

9. The display device according to claim 1, wherein, if end of sensing of the touch input is recognized, the processor is further configured to adjust the first depth to a first default depth and the second depth to a second default depth.

10. The display device according to claim 1, wherein end of sensing of the touch input is recognized by sensing the lack of the touch input for a predetermined time or more.

11. The display device according to claim 1, wherein, if end of sensing of the touch input is recognized, the processor is further configured to maintain a depth acquired when sensing of the touch input ends.

12. The display device according to claim 1, wherein the tactile feedback actuator is configured to generate the tactile feedback using ultrasonic vibration, and to control the tactile feedback by changing at least one of a frequency and a magnitude of the ultrasonic vibration.

13. The display device according to claim 1, wherein the tactile feedback actuator is configured to generate the tactile feedback via generation of micro-amperage current, and to control the tactile feedback by changing at least one of a intensity and a generation period of the micro-amperage current.

14. A control method of a display device, the method comprising: displaying a first 3D object having a first depth, wherein the first depth is obtained by synchronizing a left eye image and a right eye image having binocular parallax; enabling a tactile feedback function; sensing a touch input on a display; determining whether or not a first touch position of the touch input is within a first display area of the first 3D object having the first depth, wherein the first display area is a display area in the XY plane of the first 3D object; adjusting the first depth to make a first surface of the first 3D object coincide with a surface of the display and generating a first tactile feedback corresponding to the first 3D object when the first touch position is within the first display area, wherein the adjusted first depth is different from the first depth; adjusting the adjusted first depth to the first depth when the touch input is ended; detecting movement of the touch input; if the touch input is moved from the first touch position to a second touch position while maintaining contact with the display, determining whether or not the second touch position is within the first display area of the first 3D object, or within a second display area of a second 3D object having a second depth, wherein the second display area is a display area in the XY plane of the second 3D object; if the second touch position is within the second display area, adjusting the second depth to make a second surface of the second 3D object coincide with the surface of the display to thereby display the second 3D object and generating a second tactile feedback corresponding to the second 3D object; if the second depth of the second 3D object is adjusted, adjusting the first depth of the first 3D object together with the second depth; and if the first depth of the first 3D object is adjusted together with the second depth, adjusting the first depth in proportion to an adjustment value of the second depth.

15. The control method according to claim 14, further comprising: if the second touch position is within the first display area, maintaining the generated first tactile feedback.

* * * * *